United States Patent
Takeda et al.

(10) Patent No.: US 12,456,163 B2
(45) Date of Patent: Oct. 28, 2025

(54) MEDICAL IMAGE PROCESSING APPARATUS, MEDICAL IMAGE PROCESSING METHOD, AND STORAGE MEDIUM

(71) Applicant: CANON MEDICAL SYSTEMS CORPORATION, Otawara (JP)

(72) Inventors: Kyohei Takeda, Nasushiobara (JP); Yojiro Suzuki, Oyama (JP); Junki Hashizume, Utsunomiya (JP); Takahiro Yoda, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 429 days.

(21) Appl. No.: 18/053,879

(22) Filed: Nov. 9, 2022

(65) Prior Publication Data
US 2023/0153945 A1    May 18, 2023

(30) Foreign Application Priority Data
Nov. 18, 2021   (JP) .................. 2021-188179

(51) Int. Cl.
*G06T 3/4053* (2024.01)

(52) U.S. Cl.
CPC .................. *G06T 3/4053* (2013.01)

(58) Field of Classification Search
CPC ....... G06T 3/4053; G06T 7/0012; G06T 7/10; G06T 7/11; G06T 7/13; G06T 2207/10081; G06T 2207/20081; G06T 2207/20084; G06T 2207/20104; A61B 6/035; A61B 6/52
See application file for complete search history.

(56) References Cited

U.S. PATENT DOCUMENTS

| | | | | |
|---|---|---|---|---|
| 2005/0121505 | A1* | 6/2005 | Metz | G16H 10/65 700/214 |
| 2006/0126952 | A1* | 6/2006 | Suzuki | H04N 19/192 375/E7.199 |
| 2013/0051519 | A1  | 2/2013 | Yang et al. | |
| 2015/0332435 | A1* | 11/2015 | Motohashi | G06T 3/4076 382/171 |
| 2016/0217263 | A1* | 7/2016 | Sawada | G06T 3/4053 |
| 2018/0330474 | A1* | 11/2018 | Mehta | G06T 3/4084 |
| 2019/0370937 | A1* | 12/2019 | Tanimoto | G06T 7/33 |
| 2020/0342572 | A1* | 10/2020 | Chen | G06T 3/4046 |

(Continued)

FOREIGN PATENT DOCUMENTS

JP   2019-025044 A   2/2019

OTHER PUBLICATIONS

Christopher M. Bishop, "Pattern Recognition and Machine Learning", Springer, 2006, pp. 225-290 (68 total pages).

(Continued)

*Primary Examiner* — Molly Wilburn
(74) *Attorney, Agent, or Firm* — Oblon, McClelland, Maier & Neustadt, L.L.P.

(57) ABSTRACT

A medical image processing apparatus according to an embodiment includes processing circuitry. The processing circuitry acquires medical image data to be processed, specifies a target area to be subjected to a super-resolution process for improving image quality from the medical image data on the basis of the medical image data, and outputs information on the specified target area.

11 Claims, 9 Drawing Sheets

(56) References Cited

U.S. PATENT DOCUMENTS

2022/0188976 A1* 6/2022 Sun .................. G06T 3/4053
2024/0242309 A1* 7/2024 Shi .................. G06T 3/4053

OTHER PUBLICATIONS

Office Action issued Sep. 2, 2025, in corresponding Japanese Patent Application No. 2021-188179, citing document 15 herein, 2 pages.

\* cited by examiner

MEDICAL IMAGE PROCESSING APPARATUS, MEDICAL IMAGE PROCESSING METHOD, AND STORAGE MEDIUM

CROSS-REFERENCE TO RELATED APPLICATIONS

This application is based upon and claims the benefit of priority from Japanese Patent Application No. 2021-188179, filed on Nov. 18, 2021, the entire contents of which are incorporated herein by reference.

FIELD

Embodiments described herein relate generally to a medical image processing apparatus, a medical image processing method, and a storage medium.

BACKGROUND

In the related art, a super-resolution process is performed on medical images collected by a medical image diagnostic apparatus to increase the resolution of the images by using an artificial intelligence (AI) technology such as machine learning including deep learning.

For example, by inputting a medical image three-dimensionally reconstructed by an X-ray CT apparatus to a super-resolution model (learned model) produced by the AI technology, the image quality of the medical image is improved.

DETAILED DESCRIPTION

A medical image processing apparatus according to an embodiment includes processing circuitry. The processing circuitry acquires medical image data to be processed, specifies a target area to be subjected to a super-resolution process for improving image quality from the medical image data on the basis of the medical image data, and outputs information on the specified target area.

Hereinafter, embodiments of a medical image processing apparatus, a medical image processing method, and a computer program are described in detail with reference to the accompanying drawings.

Figure 1:
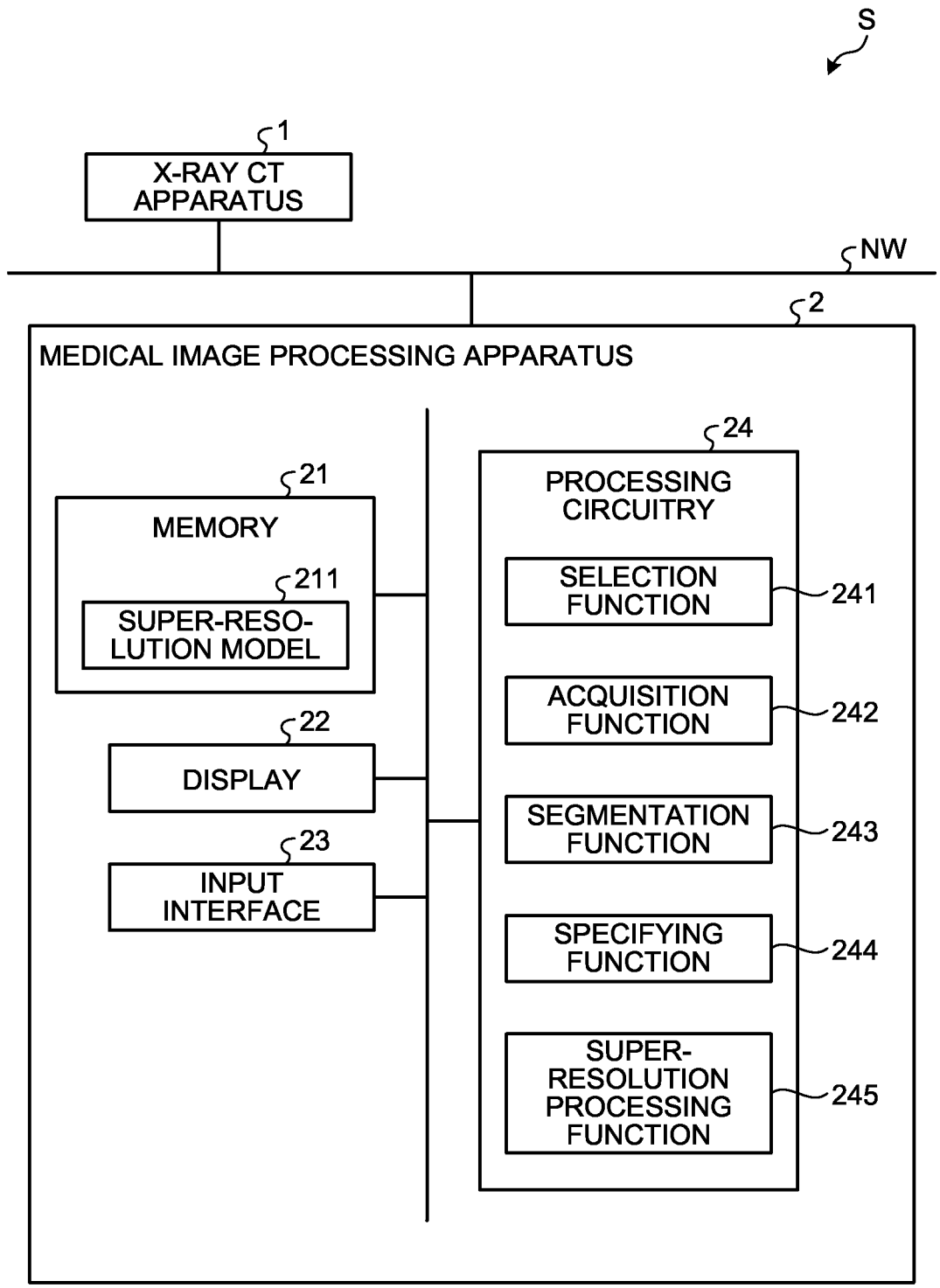
FIG. 1 is a block diagram illustrating an example of the configuration of a medical image processing system according to an embodiment.

In the present embodiment, a medical image processing system S including an X-ray CT apparatus 1 and a medical image processing apparatus 2 as illustrated in FIG. 1 is described as an example. FIG. 1 is a block diagram illustrating an example of the configuration of the medical image processing system S according to the embodiment. The present embodiment is described on the assumption that each process to be described later is performed on the basis of projection data collected by the X-ray CT apparatus 1 illustrated in FIG. 1. The X-ray CT apparatus 1 and the medical image processing apparatus 2 are interconnected via a network NW.

A location, where the X-ray CT apparatus 1 and the medical image processing apparatus 2 are installed is arbitrary, as long as they can be connected to each other via the network NW. For example, the X-ray CT apparatus 1 and the medical image processing apparatus 2 may be installed in facilities different from each other. That is, the network NW may be configured by a closed local network within the facility, or may be a network via the Internet.

Communication between the X-ray CT apparatus 1 and the medical image processing apparatus 2 may be performed via another apparatus such as an image storage apparatus or may be directly performed without the intervention of the other apparatus. An example of such an image storage apparatus includes a picture archiving and communication system (PACS) server.

Figure 2:
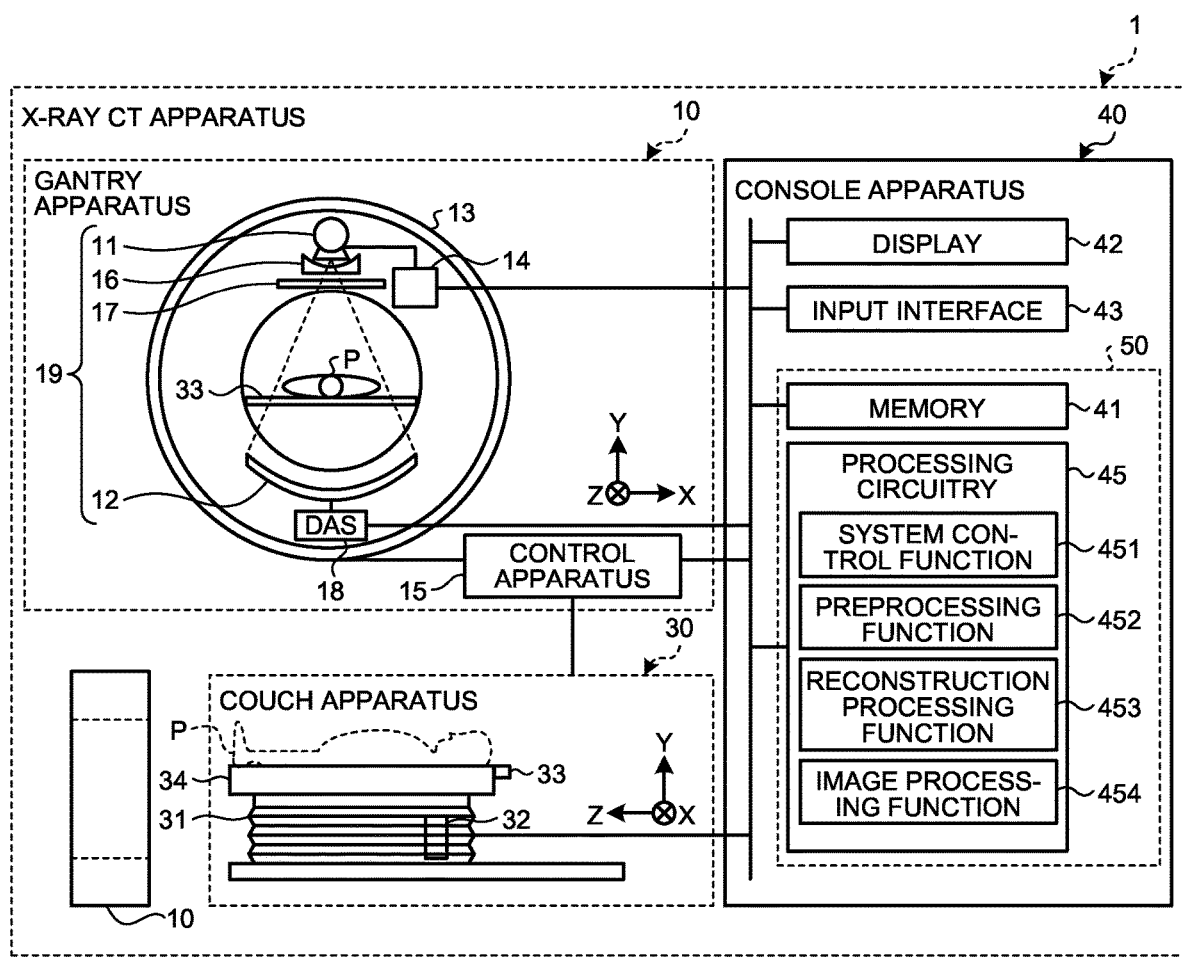
FIG. 2 is a block diagram illustrating an example of the configuration of an X-ray CT apparatus according to an embodiment.

First, the X-ray CT apparatus 1 is described with reference to FIG. 2. FIG. 2 is a block diagram illustrating an example of the configuration of the X-ray CT apparatus 1 according to the embodiment. As illustrated in FIG. 2, the X-ray CT apparatus 1 includes a gantry apparatus 10, a couch apparatus 30, and a console apparatus 40.

In the present embodiment, it is assumed that a longitudinal direction of a rotation axis of a rotating frame 13 in a non-tilted state is defined as a Z-axis direction, a direction orthogonal to the Z-axis direction and directed from the center of rotation to a support supporting the rotating frame 13 is defined as an X-axis direction, and a direction orthogonal to a Z-axis and an X-axis is defined as a Y-axis direction.

The gantry apparatus 10 includes an imaging system 19 for imaging medical images used for diagnosis. The imaging system 19 includes, for example, an X-ray tube 11, an X-ray detector 12, a wedge 16, and a collimator 17. That is, the gantry apparatus 10 is an apparatus including the imaging system 19 that irradiates a subject P with X-rays and collects projection data from detection data of the X-rays passing through the subject P.

The gantry apparatus 10 includes an opening for accommodating the subject P. A couchtop 33 on which the subject P is placed is accommodated in the opening with a side, where the couch apparatus 30 is provided, as an entrance.

The gantry apparatus 10 includes the X-ray tube 11, the wedge 16, the collimator 17, the X-ray detector 12, an X-ray high voltage apparatus 14, a data acquisition system (DAS) 18, the rotating frame 13, a control apparatus 15, and the couch apparatus 30.

The X-ray tube 11 is a vacuum tube that emits thermoelectrons from a cathode (filament) to an anode (target) by the application of a high voltage from the X-ray high voltage apparatus 14. An example of the X-ray tube 11 includes a rotating anode type X-ray tube that produces X-rays by emitting thermoelectrons to a rotating anode.

The wedge 16 is a filter for adjusting the dose of X-rays emitted from the X-ray tube 11. Specifically, the wedge 16 is a filter that attenuates the X-rays emitted from the X-ray tube 11 by allowing the X-rays to pass therethrough so that the X-rays emitted from the X-ray tube 11 to the subject P have a predetermined distribution.

The wedge 16 is, for example, a wedge filter or a bow-tie filter, and is a filter processed from aluminum so as to have a predetermined target angle and a predetermined thickness.

The collimator 17 is a lead plate or the like for narrowing down the emission range of the X-rays having passed through the wedge 16 and forms a slit by a combination of a plurality of lead plates or the like. The collimator 17 may also be referred to as an x-ray diaphragm.

The X-ray detector 12 detects the X-rays emitted from the X-ray tube 11 and passing through the subject P, and outputs an electrical signal corresponding to the dose of the X-rays to a data collection apparatus (DAS 18). The X-ray detector 12 includes, for example, a plurality of X-ray detection element arrays each including a plurality of X-ray detection elements arranged in a channel direction along one arc centered on a focal point of the X-ray tube 11. The channel direction means the circumferential direction of the rotating frame 13.

The X-ray detector 12 has, for example, a structure in which the X-ray detection element arrays are arranged in a slice direction (also called a body axis direction or a row direction), each of the X-ray detection element arrays including the X-ray detection elements arranged in the channel direction.

The X-ray detector 12 is, for example, an indirect conversion detector with a grid, a scintillator array, and a photosensor array. The scintillator array includes a plurality of scintillators, each scintillator including a scintillator crystal that outputs light with a photon quantity corresponding to an incident X-ray dose. The grid includes an X-ray shielding plate that is disposed on the surface of the scintillator array on an X-ray incident side and has a function of absorbing scatted X-rays.

The photosensor array has a function of converting light into an electrical signal corresponding to the amount of light from the scintillator, and includes, for example, a photosensor such as a photomultiplier tube (PMT). The X-ray detector 12 may be a direct conversion type detector with semiconductor elements that convert the incident X-rays into electrical signals.

The X-ray high voltage apparatus 14 includes an electrical circuit such as a transformer and a rectifier, and includes a high voltage production apparatus having a function of producing a high voltage to be applied to the X-ray tube 11, and an X-ray control apparatus that controls an output voltage corresponding to X-rays emitted by the X-ray tube 11. The high voltage production apparatus may be of a transformer type or an inverter type.

The X-ray high voltage apparatus 14 may be provided on the rotating frame 13 or may also be provided on a fixed frame (not illustrated) side of the gantry apparatus 10. The fixed frame is a frame that supports the rotating frame 13 in a rotatable manner.

The DAS 18 includes an amplifier that amplifies an electrical signal output from each X-ray detection element of the X-ray detector 12 and an A/D converter that converts the electrical signal into a digital signal, and produces detection data. The detection data produced by the DAS 18 is transmitted to the console apparatus 40. The detection data is, for example, a sinogram.

The sinogram is data that indicates projection data, which is produced for each position of the X-ray tube 11 (hereinafter, also referred to as view angle) and for each X-ray detection element, in correlation with a view direction and the channel direction. The view direction corresponds to the view angle and means an X-ray emission direction.

When a single scan is performed using only one detection element array in the X-ray detector 12, one sinogram can be produced for one scan. When a helical scan or a volume scan is performed using a plurality of detection element arrays in the X-ray detector 12, a plurality of sinograms can be produced for one scan.

The rotating frame 13 is an annular frame that supports the X-ray tube 11 and the X-ray detector 12 so as to face each other and rotates the X-ray tube 11 and the X-ray detector 12 by the control apparatus 15. The rotating frame 13 further supports the X-ray high voltage apparatus 14 and the DAS 18 in addition to the X-ray tube 11 and the X-ray detector 12.

The rotating frame 13 is rotatably supported by a non-rotating portion (for example, a fixed frame and not illustrated in FIG. 2) of the gantry apparatus. The rotating mechanism includes, for example, a motor that generates a rotational driving force and a bearing that transmits the rotational driving force to the rotating frame 13 for rotation. The motor is provided, for example, on the non-rotating portion, the bearing is physically connected to the rotating frame 13 and the motor, and the rotating frame 13 rotates according to the rotational force of the motor.

The rotating frame 13 and the non-rotating portion are each provided with a non-contact or contact-based communication circuit, which allows communication to be performed between a unit supported by the rotating frame 13 and the non-rotating portion or an external apparatus of the gantry apparatus 10.

For example, when optical communication is adopted as a non-contact communication method, the detection data produced by the DAS 18 is transmitted by optical communication from a transmitter including a light-emitting diode (LED) provided on the rotating frame 13 to a receiver provided on the non-rotating portion of the gantry apparatus and including a photodiode, and is further transmitted from the non-rotating portion to the console apparatus 40 by the transmitter.

Moreover, in addition to non-contact type data transmission such as a capacitive coupling type and a radio wave type, a contact type data transmission method using a slip ring and an electrode brush may also be adopted as the communication method.

The control apparatus 15 includes processing circuitry having a CPU and the like, and a driving mechanism such as a motor and an actuator. The control apparatus 15 has a function of receiving an input signal from an input interface 43 to be described below, which is attached to the console apparatus 40 or the gantry apparatus 10, and controlling the operations of the gantry apparatus 10 and the couch apparatus 30.

For example, the control apparatus 15 receives the input signal and performs control of rotating the rotating frame 13, tilting the gantry apparatus 10, and operating the couch apparatus 30 and the couchtop 33. The control of tilting the gantry apparatus 10 is implemented by the control apparatus 15 that rotates the rotating frame 13 around an axis parallel to the X-axis direction on the basis of information on inclination angle (tilt angle) input by the input interface attached to the gantry apparatus 10.

The control apparatus 15 may be provided in the gantry apparatus 10 or may also be provided in the console apparatus 40.

The couch apparatus 30 is an apparatus that places and moves the subject P to be scanned and includes a base 31, a couch driving apparatus 32, the couchtop 33, and a support frame 34. The base 31 is a housing that supports the support frame 34 in a vertically movable manner. The couch driving apparatus 32 is a motor or an actuator that moves the couchtop 33, on which the subject P is placed, in the long axis direction (Z-axis direction in FIG. 2).

The couchtop 33 provided on an upper surface of the support frame 34 is a plate on which the subject P is placed. The couch driving apparatus 32 may also move the support frame 34 in the long axis direction of the couchtop 33 in addition to the couchtop 33.

The couch driving apparatus 32 moves the base 31 vertically according to a control signal from the control apparatus 15. The couch driving apparatus 32 moves the couchtop 33 in the long axis direction (Z-axis direction) according to a control signal from the control apparatus 15.

The console apparatus 40 is an apparatus that receives an operator's operation of the X-ray CT apparatus 1, and reconstructs X-ray CT image data from X-ray detection data collected by the gantry apparatus 10. The console apparatus 40 includes a memory 41, a display 42, the input interface 43, and processing circuitry 45.

The memory 41 is implemented by, for example, a semiconductor memory element such as a random access memory (RAM) and a flash memory, a hard disk, an optical disc, or the like. The memory 41 stores therein, for example, projection data and reconstructed image data. The memory 41 also stores therein an imaging protocol.

The imaging protocol defines a procedure or the like for controlling the imaging system 19 to capture an image of the subject P and acquiring the image. The imaging protocol is, for example, a group of parameters such as an imaging site, imaging conditions, an imaging range, reconstruction conditions, operations of the gantry apparatus 10 (imaging system 19), and operations of the couch apparatus 30.

The memory 41 further stores therein dedicated computer programs for implementing a system control function 451, a preprocessing function 452, a reconstruction processing function 453, and an image processing function 454 to be described later.

The display 42 is a monitor that the operator refers to and displays various information. For example, the display 42 outputs a medical image (CT image) produced by the processing circuitry 45, a graphical user interface (GUI) for receiving various operations from the operator, and the like. For example, the display 42 is a liquid crystal display or a cathode ray tube (CRT) display.

The input interface 43 receives various input operations from the operator, converts the received input operations into electrical signals, and outputs the electrical signals to the processing circuitry 45. For example, the input interface 43 receives, from the operator, collection conditions when collecting the projection data, reconstruction conditions when reconstructing the CT image, image processing conditions when producing a post-processing image from the CT image, and the like.

For example, the input interface 43 is implemented by a mouse, a keyboard, a trackball, a switch, a button, a joystick, and the like. The input interface 43 may also be provided on the gantry apparatus 10. The input interface 43 may also include a tablet terminal or the like capable of wirelessly communicating with the console apparatus 40 itself.

The processing circuitry 45 controls the operation of the entire X-ray CT apparatus 1. The processing circuitry 45 has, for example, the system control function 451, the preprocessing function 452, the reconstruction processing function 453, and the image processing function 454.

In the embodiment, processing functions performed by the system control function 451, the preprocessing function 452, the reconstruction processing function 453, and the image processing function 454, which are components, are stored in the memory 41 in the form of computer programs executable by a computer. The processing circuitry 45 is a processor that reads the computer programs from the memory 41 and executes the read computer programs, thereby implementing the functions corresponding to the executed computer programs.

In other words, the processing circuitry 45 in the state of reading the computer programs has the functions illustrated in the processing circuitry 45 in FIG. 2

In FIG. 2, the processing functions performed by the system control function 451, the preprocessing function 452, the reconstruction processing function 453, and the image processing function 454 are described as being implemented by a single piece of the processing circuitry 45; however, a plurality of independent processors may be combined to form the processing circuitry 45 and the functions may be implemented by each processor executing the computer program.

In other words, each of the above functions may be configured as a computer program, and one piece of processing circuitry may execute each computer program, or a specific function may be implemented in a dedicated independent program execution circuit.

The system control function 451 controls various functions of the processing circuitry 45 on the basis of input operations received from the operator via the input interface 43. For example, the system control function 451 receives input of user information (for example, user ID and the like) for login, subject information, and the like via the input interface 43. For example, the system control function 451 also receives input of the imaging protocol via the input interface 43.

The preprocessing function 452 produces data by performing preprocessing, such as logarithmic transformation processing, offset processing, inter-channel sensitivity correction processing, and beam hardening correction, on the detection data output from the DAS 18. Data before the preprocessing (detection data) and data after the preprocessing may be collectively referred to as projection data.

The reconstruction processing function 453 produces a plurality of pieces of slice image data (CT image data) by performing a reconstruction process using a filter backprojection method, a successive approximation reconstruction method, or the like on the projection data produced by the preprocessing function 452, according to reconstruction conditions on the basis of information on a site of the subject P to be subjected to a super-resolution process, the information being transmitted from the medical image processing apparatus 2 to be described later. The produced slice image data is transmitted to the medical image processing apparatus 2, and the medical image processing apparatus 2 performs a super-resolution process. The slice image data is an example of the medical image data.

Upon receiving a transmission request for reference image data from the medical image processing apparatus 2, the reconstruction processing function 453 performs the reconstruction process on the projection data to produce the reference image data. The reference image is a slice image used for selecting a target site to be subjected to the super-resolution process. Since the reference image is not used for diagnosis, it may be a low-quality image. The produced reference image data is transmitted to the medical image processing apparatus 2 by the processing circuitry 45.

The image processing function 454 converts the super-resolution processed slice image data (hereinafter, also referred to as "super-resolution slice image data") received from the medical image processing apparatus 2 into cross-sectional tomographic image data or three-dimensional image data by a known method on the basis of an input operation received from the operator via the input interface 43. The production of the three-dimensional image data may also be performed by the reconstruction processing function 453.

The post-processing may be performed by either the console apparatus 40 or the medical image processing apparatus 2. The post-processing may also be simultaneously performed by both the console apparatus 40 and the medical image processing apparatus 2.

The post-processing as defined herein is a concept that refers to a process on a plurality of pieces of super-resolution slice image data received from the medical image processing apparatus 2. For example, the post-processing is a process including noise removal, multi-planar reconstruction (MPR) display of a plurality of super-resolution slice images, volume data rendering, and the like.

Referring now back to FIG. 1, the medical image processing apparatus 2 is described. The medical image processing apparatus 2 is an apparatus that performs a super-resolution process of improving image quality on the slice image data produced by scanning the subject P with the X-ray CT apparatus 1. In the present embodiment, a case in which the super-resolution process is performed by the medical image processing apparatus 2 on the slice image data produced by the X-ray CT apparatus 1 is described as an example.

The medical image processing apparatus 2 includes, for example, a memory 21, a display 22, an input interface 23, and processing circuitry 24 as illustrated in FIG. 1.

The memory 21 stores therein various information. The memory 21 stores therein, for example, a super-resolution model 211. The super-resolution model 211 is, for example, a trained model functionalized to output super-resolution slice image data in response to input of slice image data. The super-resolution model 211 may be stored in an external apparatus such as a server connected to the medical image processing apparatus 2 via the network NW. The super-resolution model 211 is described later.

For example, the memory 21 also stores therein computer programs that enable circuits included in the medical image processing apparatus 2 to perform their functions. For example, the memory 21 also stores therein data received from the X-ray CT apparatus 1 and data produced by the processing circuitry 24.

The memory 21 is implemented by a semiconductor memory element such as a random access memory (RAM) and a flash memory, a hard disk, an optical disc, or the like. The memory 21 may be implemented by a group of servers (cloud) connected to the medical image processing apparatus 2 via the network NW.

The display 22 displays various information. For example, the display 22 displays a graphical user interface (GUI) for receiving various instructions, settings, and the like from a user via the input interface 23.

For example, the display 22 is a liquid crystal display or a cathode ray tube (CRT) display. The display 22 may be of a desktop type, or may be configured by a tablet terminal or the like capable of wirelessly communicating with the medical image processing apparatus 2 itself.

The input interface 23 receives various input operations from the user, converts the received input operations into electrical signals, and outputs the electrical signals to the processing circuitry 24. For example, the input interface 23 is implemented by a mouse, a keyboard, a trackball, a switch, a button, a joystick, a touch pad for performing an input operation by touching an operation surface, a touch screen with integrated display screen and touch pad, a non-contact input circuit using an optical sensor, a voice input circuit, or the like.

The input interface 23 may also be configured by a tablet terminal or the like capable of wirelessly communicating with the medical image processing apparatus 2 itself. The input interface 23 may also be a circuit that receives input operations from the user through motion capture. In one example, the input interface 23 can receive user's body movements, line of sight, or the like as input operations by processing signals acquired via a tracker and images collected about the user.

The input interface 23 is not limited to only those with physical operating components such as a mouse and a keyboard. For example, an example of the input interface 23 also includes electrical signal processing circuitry that receives electrical signals corresponding to input operations from an external input apparatus provided separately from the medical image processing apparatus 2 and outputs the electrical signals to the processing circuitry 24.

The processing circuitry 24 controls the operation of the entire medical image processing apparatus 2 by performing a selection function 241, an acquisition function 242, a segmentation function 243, a specifying function 244, and a super-resolution processing function 245.

In the medical image processing apparatus 2 illustrated in FIG. 1, the respective processing functions are stored in the memory 21 in the form of computer programs executable by a computer. The processing circuitry 24 is a processor that reads the computer programs from the memory 21 and executes the read computer programs, thereby implementing functions corresponding to the executed computer programs. In other words, the processing circuitry 24 in the state of reading the computer programs has the functions corresponding to the read computer programs.

In FIG. 1, the selection function 241, the acquisition function 242, the segmentation function 243, the specifying function 244, and the super-resolution processing function 245 are described as being implemented by a single piece of the processing circuitry 24; however, a plurality of independent processors may be combined to form the processing circuitry 24 and the functions may be implemented by the respective processors executing the computer programs. Furthermore, the respective processing functions of the processing circuitry 24 may be implemented by being appropriately distributed or integrated into a single piece of or a plurality of pieces of processing circuitry.

The processing circuitry 24 may also perform the functions by using a processor of an external apparatus connected via the network NW. For example, the processing circuitry 24 reads computer programs corresponding to the respective functions from the memory 21, and executes the read computer programs, and implements the respective functions illustrated in FIG. 1 by using a group of servers (cloud) connected to the medical image processing apparatus 2 via the network NW as computing resources.

The selection function 241 selects the target site of the subject P to be subjected to the super-resolution process from the slice image data. Specifically, the selection function 241 first transmits a transmission request for reference image data to the X-ray CT apparatus 1. Subsequently, the selection function 241 receives the reference image data from the X-ray CT apparatus 1. Subsequently, the selection function 241 outputs the reference image data to the display 22.

Figure 3:
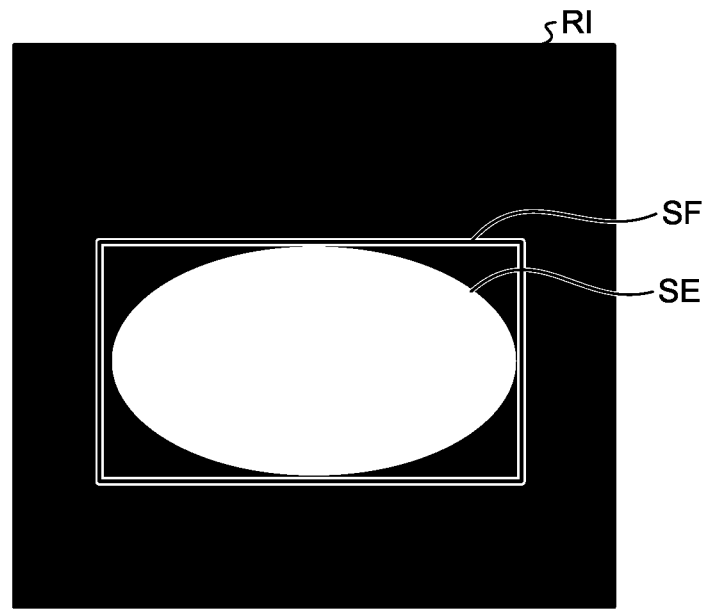
FIG. 3 is an explanatory diagram illustrating an example of a target site selection process according to an embodiment.

Subsequently, the selection function 241 receives input of an instruction to select a target site from the user. FIG. 3 is an explanatory diagram illustrating an example of the selection process. Reference image data RI in FIG. 3 is slice image data representing a specific cross section of the subject P. The user gives an instruction to select a target site on the reference image data RI by using a selection frame SF. The position, size, shape, and the like of the selection frame SF can be freely adjusted by the user.

The selection function 241 selects the target site according to the input of the target site selection instruction received from the user. For example, in FIG. 3, the selection function 241 selects an area surrounded by the selection frame SF as a selection area SE serving as the target site.

The selection function 241 may automatically select the target site on the basis of the imaging site of the subject P or the like. In this case, the selection function 241 selects the target site on the basis of positioning image data taken to determine the imaging site. When a plurality of target sites are derived as candidates from the positioning image data, the selection function 241 may receive, from the user, input indicating which of the candidates is the target site.

The selection function 241 may also automatically select the target site on the basis of the medical history of the subject P. For example, when the medical history of the subject P includes pulmonary disease, the selection function 241 may select the lung as the target site. When a plurality of target sites are derived from the medical history as candidates, the selection function 241 may receive, from the user, input indicating which of the candidates is the target site.

The contents of the user's selection input for the target site (information on the selection area SE in FIG. 2) are transmitted to the X-ray CT apparatus 1 by the processing circuitry 24. The reconstruction processing function 453 of the X-ray CT apparatus 1 performs the reconstruction process on the basis of the contents of the user's selection input, and produces a plurality of pieces of slice image data.

The acquisition function 242 acquires the pieces of slice image data to be processed. Specifically, on the basis of the contents of the user's selection input for the target site, the acquisition function 242 acquires the pieces of slice image data produced by the reconstruction processing function 453 of the X-ray CT apparatus 1. The acquisition function 242 acquires a plurality of pieces of slice image data in which the target site selected by the selection function 241 exists.

Figure 4:
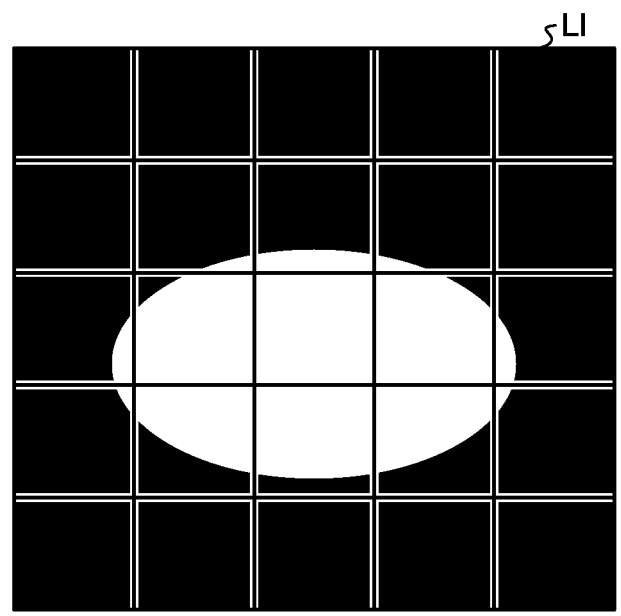
FIG. 4 is an explanatory diagram illustrating an example of a slice image data segmentation process according to an embodiment.

The segmentation function 243 segments one piece of slice image data into a plurality of pieces of sub-slice image data. The sub-slice image data is an example of sub-data. Specifically, the segmentation function 243 segments each piece of the slice image data acquired by the acquisition function 242 into a plurality of pieces of sub-slice image data. FIG. 4 is a diagram illustrating an example of a segmentation process of slice image data. As illustrated in FIG. 4, the segmentation function 243 segments a slice image LI into grid-like areas of 5 longitudinal columns×5 transverse rows.

Image data representing each area segmented by the segmentation function 243 in this way is sub-slice image data. In FIG. 4, 25 pieces of sub-slice image data are produced from one piece of slice image data.

In FIG. 4, the segmentation function 243 segments the slice image LI into the areas of 5 longitudinal columns×5 transverse rows; however, the segmentation method is not limited thereto. For example, the segmentation function 243 may segment the slice image LI into areas of 2 longitudinal columns×2 transverse rows, or segment the slice image LI into areas of 10 longitudinal columns×5 transverse rows.

On the basis of the slice image data, the specifying function 244 specifies, in the slice image data, a target area to be subjected to a super-resolution process of improving image quality and an out-of-target area not to be subjected to the super-resolution process. Specifically, the specifying function 244 specifies the target area and the out-of-target area for each piece of the pieces of sub-slice image data produced by the segmentation function 243.

More specifically, the specifying function 244 specifies the target area on the basis of the target site selected by the selection function 241, reference feature amounts set in advance for each site of the human body, and the distribution of feature amounts included in the sub-slice image data. The feature amount is an example of a data value.

For example, an edge amount is used as the feature amount. In an example, when the target site is the liver, the specifying function 244 calculates an edge amount of the sub-slice image data and compares the calculated edge amount with a predetermined edge amount representing the liver (hereinafter, also referred to as a reference edge amount). The edge amount can be calculated by an existing method using a differential value obtained by discrete differentiation, a high-frequency amplitude obtained by two-dimensional Fourier transform, a value obtained by feature extraction by filtering, or the like.

When the calculated edge amount and the reference edge amount are similar, the specifying function 244 specifies, as the target area, a specific area on the slice image data represented by the sub-slice image data. On the other hand, when the calculated edge amount and the reference edge amount are not similar, the specifying function 244 specifies, as the out-of-target area, a specific area on the slice image data represented by the sub-slice image data.

Whether the calculated edge amount and the reference edge amount are similar is determined by, for example, setting a threshold value for a difference value between the two amounts. In this case, when the difference value is less than the threshold value, the specifying function 244 determines that the calculated edge amount and the reference edge amount are similar. On the other hand, when the difference value is equal to or greater than the threshold value, the specifying function 244 determines that the calculated edge amount and the reference edge amount are not similar.

After transforming the slice image data into polar coordinates, the specifying function 244 may perform a one-dimensional Fourier transform in a distance direction and specify the target area at a minimum distance where a high frequency amplitude is equal to or less than a predetermined threshold value. This is because the center of the slice image is likely to include important information.

In the above, the edge amount is used as the feature amount; however, the feature amount may be, for example, a CT value or the like. For example, a combination of two elements such as the CT value and the edge amount may be used as the feature amount.

The specifying function 244 performs a process (hereinafter, simply referred to as a specifying process) of specifying a target area and an out-of-target area for a plurality of pieces of slice image data in which the target site selected by the selection function 241 exists. The specifying function 244 may not perform the specifying process on slice image data adjacent to the slice image data subjected to the specifying process.

This is because, for example, when certain slice image data includes a target area, slice image data adjacent to the slice image data is also likely to include the target area. When the specifying process is not performed, the number of pieces of slice image data ahead from certain slice image data, on which the specifying process is not performed, may be predetermined in advance. In this case, the number of pieces of data, on which the specifying process is not performed, may be changed depending on a target area.

The specifying function 244 may produce specific processing-image data for the specific process. For example, the specifying function 244 produces the specific processing-image data by downsampling sub-slice image data in a range in which a target site can be determined. By producing the downsampled specific processing-image data, a processing burden on the processing circuitry 24 can be reduced.

The specifying function 244 may also perform the specific process by using edge-enhanced specific processing-image data. In this case, for example, the reconstruction processing function 453 of the X-ray CT apparatus 1 performs edge extraction of a target site on a sinogram, performs the reconstruction process on the basis of the extraction result, and produces the edge-enhanced specific processing-image data. The edge enhancement makes it easier to specify a target area.

The super-resolution processing function 245 performs a super-resolution process on the slice image data on the basis of information on the target area. For example, the super-resolution processing function 245 performs the super-resolution process by using the super-resolution model 211.

Figure 5:
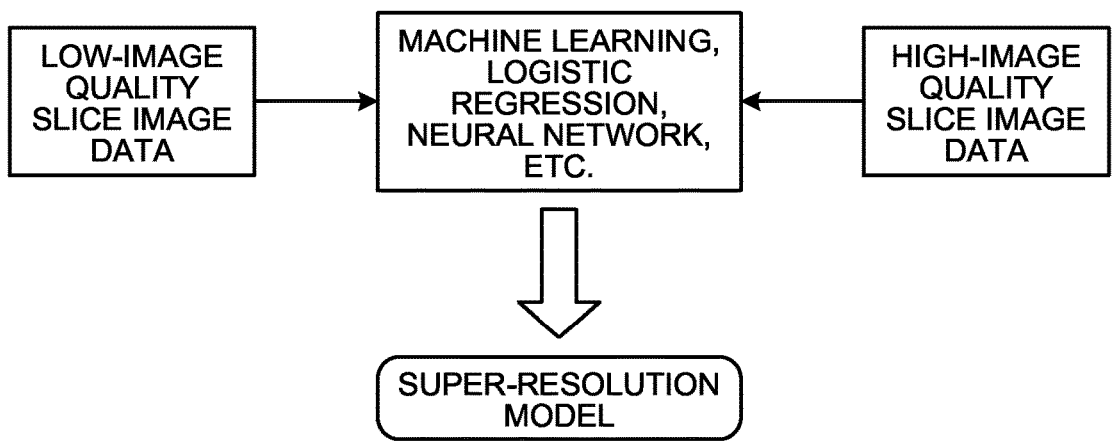
FIG. 5 is an explanatory diagram illustrating an example of a super-resolution model production method by machine learning according to an embodiment.

The process of producing the super-resolution model 211 is described below with reference to FIG. 5. FIG. 5 is an explanatory diagram illustrating an example of a method of producing the super-resolution model 211 by machine learning. The super-resolution model 211 may be produced by the medical image processing apparatus 2 or may also be produced by an external apparatus other than the medical image processing apparatus 2. Hereafter, an apparatus that produces the super-resolution model 211 is referred to as a learning apparatus.

For example, as illustrated in FIG. 5, the learning apparatus performs machine learning by inputting "low-image quality slice image data", which is input-side teacher data, and "high-image quality slice image data", which is obtained by improving the image quality of the low-image quality slice image data, which is output-side teacher data, into a machine learning engine as a learning data set.

The low-image quality slice image data is, for example, obtained by reducing once the size of high-image quality slice image data captured with a high dose and then decreasing the image quality of the reduced slice image data through processing such as re-enlargement. The method of collecting the low-image quality slice image data is not limited thereto. For example, the same site of the subject P may be imaged at both a low dose and a high dose, and slice image data captured with the low dose may be used as the low-image quality slice image data.

As the machine learning engine, for example, a neural network described in the well-known non-patent Literature ""Pattern recognition and machine learning" by Christopher M. Bishop, (U.S.), $1^{st}$ edition, Springer, 2006, pp. 225 to 290", or the like can be applied.

As for the machine learning engine, in addition to the above neural network, for example, various algorithms such as deep learning, logistic regression analysis, nonlinear discriminant analysis, support vector machine (SVM), random forest, and naive Bayes may also be used.

The super-resolution model 211 produced by the above-described learning apparatus is functionalized to output super-resolution slice image data (high-image quality slice image data) in response to input of slice image data (low-image quality slice image data).

Figure 6:
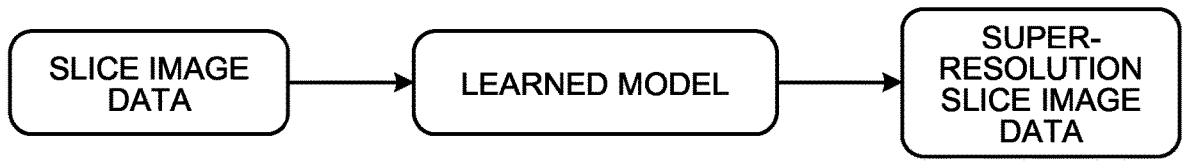
FIG. 6 is diagram illustrating an example of an input/output image of a super-resolution model according to an embodiment.

FIG. 6 is a diagram illustrating an example of an input/output image of the super-resolution model 211. As illustrated in FIG. 6, the super-resolution model 211 outputs super-resolution slice image data, which is obtained by improving the image quality of slice image data, in response to the input of the slice image data. The super-resolution processing function 245 performs a super-resolution process by using the super-resolution model 211.

First, the super-resolution processing function 245 inputs, to the super-resolution model 211, image data obtained by cropping an area specified as a target area from sub-slice image data. The super-resolution processing function 245 acquires super-resolution image data output from the super-resolution model 211.

In this example, the sub-slice image data obtained by cropping the area specified as the target area from the sub-slice image data is input to the super-resolution model 211; however, information obtained by polar coordinate transformation of the area specified as the target area may be input to the super-resolution model 211. The super-resolution model 211 in this case is, for example, a learned model trained using the result of the polar coordinate transformation as input-side teacher data.

Subsequently, the super-resolution processing function 245 produces super-resolution sub-slice image data by merging image data representing an area not input to the super-resolution model 211 (area other than the cropped area on the sub-slice image data) with the super-resolution image data output from the super-resolution model 211.

Subsequently, the super-resolution processing function 245 performs the same process on all pieces of sub-slice image data including the area specified as the target area. Then, the super-resolution processing function 245 produces super-resolution slice image data by merging all pieces of the produced super-resolution sub-slice image data with all pieces of the sub-slice image data excluding the area specified as the target area. The produced super-resolution slice image data is transmitted to the X-ray CT apparatus 1, and post-processing is performed by the X-ray CT apparatus 1.

When the super-resolution model 211 is stored in an external apparatus, the super-resolution processing function 245 transmits sub-slice image data representing the area specified as the target area to the external apparatus. Then, the super-resolution processing function 245 acquires, from the external apparatus, super-resolution sub-slice image data output from the super-resolution model 211.

Figure 7:
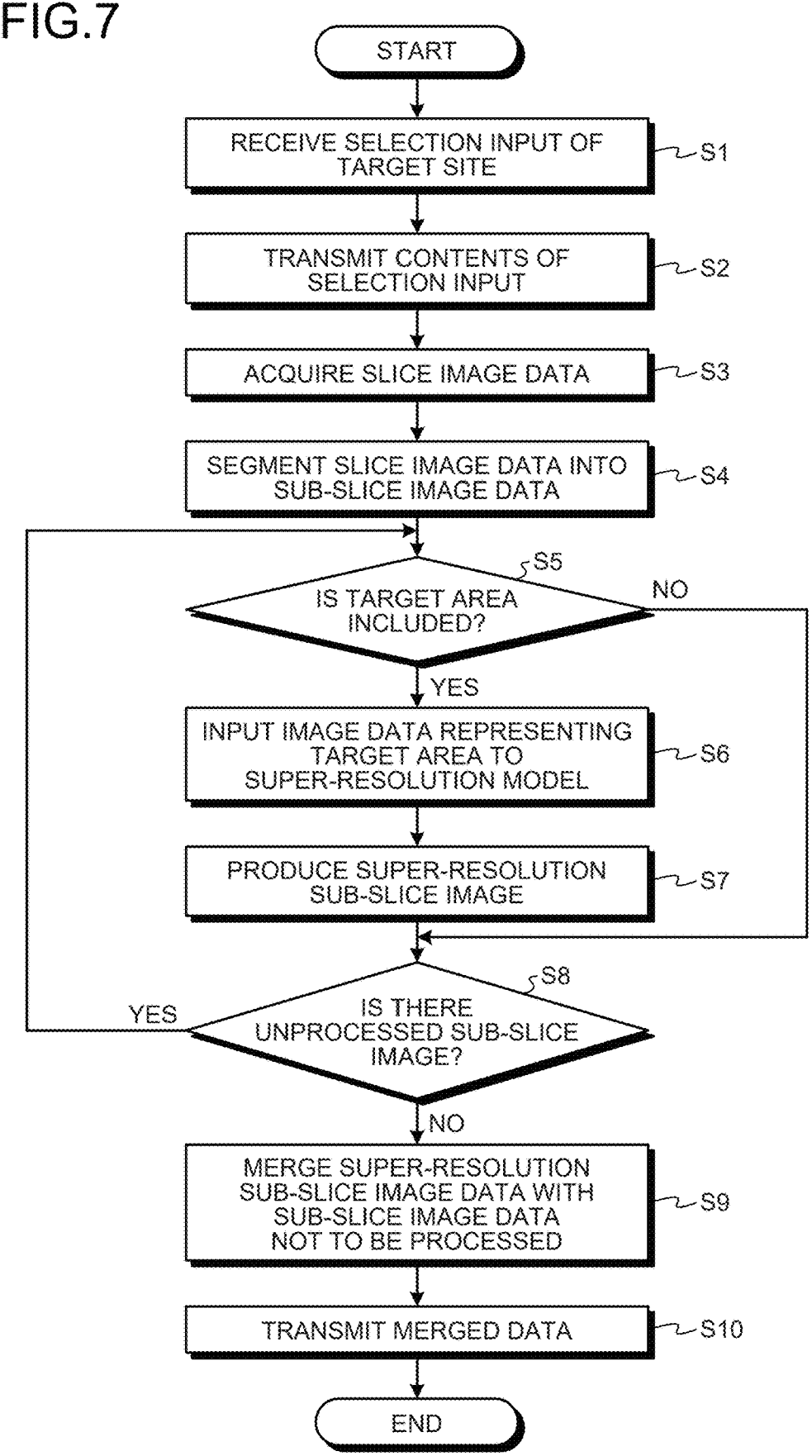
FIG. 7 is a flowchart illustrating an example of a process performed by a medical image processing apparatus according to an embodiment.

Next, a process performed by the medical image processing apparatus 2 is described. FIG. 7 is a flowchart illustrating an example of a process performed by the medical image processing apparatus 2.

First, the selection function 241 selects a target site for a super-resolution process. Specifically, the selection function 241 acquires reference image data from the X-ray CT apparatus 1. The selection function 241 receives selection input of the target site from the user by using reference image data (step S1). Subsequently, the selection function 241 transmits the contents of the selection input of the target site received from the user to the X-ray CT apparatus 1 (step S2).

Upon receiving the contents of the selection input of the target site, the X-ray CT apparatus 1 performs the reconstruction process on projection data on the basis of the contents of the selection input of the target site, and produces a plurality of pieces of slice image data. The pieces of produced slice image data are transmitted to the medical image processing apparatus 2 by the processing circuitry 45 of the X-ray CT apparatus 1.

Subsequently, the acquisition function 242 acquires the pieces of slice image data to be processed (step S3). Specifically, the acquisition function 242 acquires the pieces of slice image data transmitted from the X-ray CT apparatus 1 and including the target site. Subsequently, the segmentation function 243 segments the slice image data into sub-slice image data (step S4). Specifically, the segmentation function 243 segments the slice image into a grid pattern, and sets the images representing the segmented areas as sub-slice images.

Subsequently, the specifying function 244 specifies a target area and an out-of-target area for each piece of the sub-slice image data. Specifically, the specifying function 244 specifies the target area and the out-of-target area on the basis of the target site selected by the selection function 241 and a reference edge amount set in advance for each site of the human body. Subsequently, the specifying function 244 determines whether each piece of the sub-slice image data includes an area specified as the target area (step S5).

When it is determined by the specifying function 244 that each piece of the sub-slice image data does not include the area specified as the target area (No at step S5), the procedure proceeds to the process of step S8. On the other hand, when it is determined by the specifying function 244 that each piece of the sub-slice image data includes the area specified as the target area (Yes at step S5), the super-resolution processing function 245 inputs image data obtained by cropping the area specified as the target area in the sub-slice image data to the super-resolution model 211 (step S6).

Subsequently, the super-resolution processing function 245 produces super-resolution sub-slice image data (step S7). Specifically, the super-resolution processing function 245 acquires the super-resolution image data output from the super-resolution model 211. Subsequently, the super-resolution processing function 245 merges the super-resolution image data with image data representing the out-of-target area to produce super-resolution sub-slice image data in which the target area is increased in resolution.

Subsequently, the super-resolution processing function 245 checks the presence or absence of (unprocessed) sub-slice image data subjected to no specifying process (step S8). When the unprocessed sub-slice image data exists (Yes at step S8), the procedure proceeds to the process of step S5. On the other hand, when there is no unprocessed sub-slice image data (No at step S8), the super-resolution processing function 245 merges all pieces of the produced super-resolution sub-slice image data with all pieces of the sub-slice image data including only the area specified as the out-of-target area to produce super-resolution slice image data (step S9). The super-resolution processing function 245 transmits the super-resolution slice image data to the X-ray CT apparatus 1 (step S10) and terminates this process.

The medical image processing apparatus 2 according to the embodiment described above acquires slice image data to be processed, specifies a target area to be subjected to the super-resolution process and an out-of-target area not to be subjected to the super-resolution process in the slice image data, and outputs information on the specified target area.

This makes it possible to specify the target area and output information on the target area, so that the super-resolution process is not performed on the out-of-target area. Consequently, the time required for the super-resolution process can be reduced. That is, the medical image processing apparatus 2 according to the present embodiment can improve the efficiency of the super-resolution process on a medical image.

The medical image processing apparatus 2 according to the present embodiment also performs the super-resolution process on the slice image data on the basis of the output information on the specified target area. This makes it possible to reduce the number of times of data transmission/reception to/from an external apparatus. Consequently, the efficiency of the super-resolution process on a medical image can be further improved.

The medical image processing apparatus 2 according to the present embodiment also selects a target site being a site of the subject P to be subjected to the super-resolution process. This makes it possible to prevent the super-resolution process from being performed on, for example, a site of the subject P not to be subjected to diagnosis. Consequently, the efficiency of the super-resolution process on a medical image can be improved.

The medical image processing apparatus 2 according to the present embodiment may also select a pre-target site according to a selection instruction from a user. This makes it possible to perform the super-resolution process only on a site of the subject P designated by the user.

The medical image processing apparatus 2 may also select a target site on the basis of positioning image data produced by positioning imaging. This makes it possible to reduce a burden on the user because the target site is automatically selected even though the target site is not selected.

When the subject P has a past medical history, the medical image processing apparatus 2 according to the present embodiment may select a target site on the basis of the medical history. This makes it possible to reduce a burden on the user because, for example, a site of the subject P subjected to diagnosis in the past is automatically selected as a target site.

The medical image processing apparatus 2 according to the present embodiment also specifies a target area on the basis of a predetermined reference value of feature amounts representing a target site and a distribution of feature amounts included in the slice image data. This makes it possible to accurately specify the target area. By accurately specifying the target area, the super-resolution process is not performed on an area requiring no super-resolution process, so that the efficiency of the super-resolution process on a medical image can be improved.

In the present embodiment, the feature amount includes at least one of a CT value and an edge amount. This makes it possible to accurately specify a target area by calculating existing data values such as the CT value and the edge amount.

The medical image processing apparatus 2 according to the present embodiment also segments the slice image data into a plurality of pieces of sub-slice image data and specifies a target area on the basis of the pieces of sub-slice image data. This makes it possible to reduce a processing burden because the number of areas to be subjected to the specific process each time is reduced.

The above-described embodiment can also be appropriately modified and carried out by changing some of the configurations or functions of each apparatus. Therefore, some modifications on the above-described embodiment are described below as other embodiments. In the following, points different from those in the above-described embodiment are mainly described and detailed description of points common to the contents already described is omitted. The modifications to be described below may be carried out individually or in combination as appropriate.

First Modification

In the above-described embodiment, a case in which the medical image diagnostic apparatus is an X-ray CT apparatus has been described as an example; however, the embodiment is not limited thereto. The medical image diagnostic apparatus may be, for example, a magnetic resonance imaging (MRI) apparatus, an angio-CT system, a tomosynthesis apparatus, a single photon emission computed tomography (SPECT) apparatus, a positron emission computed tomography (PET) apparatus, or the like.

The present modification is not limited to the X-ray CT apparatus, and can improve the image quality of medical image data taken with low image quality. This makes it possible to reduce a burden on the subject P due to the imaging of a medical image.

Second Modification

In the above-described embodiment, a mode in which an information processing apparatus separately provided from the console apparatus 40 of the X-ray CT apparatus 1 is used as the medical image processing apparatus 2 has been described. However, the console apparatus 40 may have a functional configuration including the medical image processing apparatus 2. According to the present modification, the efficiency of a super-resolution process on a medical image can be improved because it is possible to perform processes such as the reconstruction process and the super-resolution process with one apparatus.

Third Modification

In the above-described embodiment, a mode in which the specific process is also performed on an area other than the target site selected by the selection function 241 and an air area representing air has been described. However, the specific process may not be performed on an area (hereinafter, referred to as a mask area) obtained by masking the area other than the target site and the air area.

Figure 8:
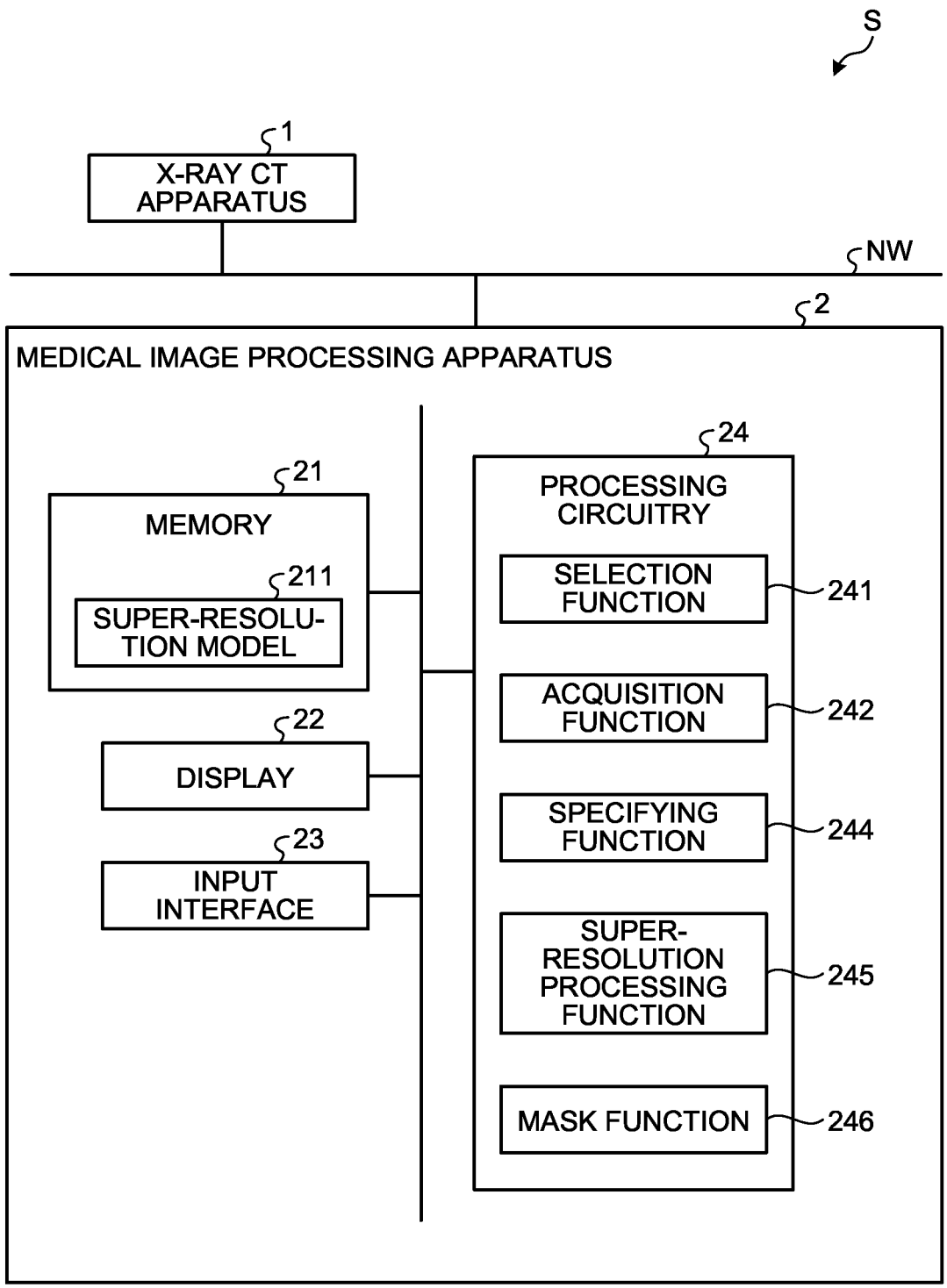
FIG. 8 is a block diagram illustrating an example of the configuration of a medical image processing system according to a third modification.

FIG. 8 is a block diagram illustrating an example of the configuration of a medical image processing system S according to a third modification. As illustrated in FIG. 8, the medical image processing apparatus 2 according to the third modification includes a mask function 246 as a functional unit. In the example in FIG. 8, the medical image processing apparatus 2 does not have the segmentation function 243.

The mask function 246 masks the area other than the target site and the air area on the slice image data. For example, the mask function 246 crops the target site selected by the selection function 241 and sets an area other than the cropped area as the mask area.

The mask function 246 detects the air area on the basis of the CT value of each pixel constituting the slice image data. This is because air is drawn in black in the slice image. Consequently, by setting a threshold value for the CT value, an area indicating the CT value less than the threshold value can be detected as the air area. Then, the mask function 246 sets the detected air area as the mask area. The mask process is described below with reference to FIG. 9.

Figure 9:
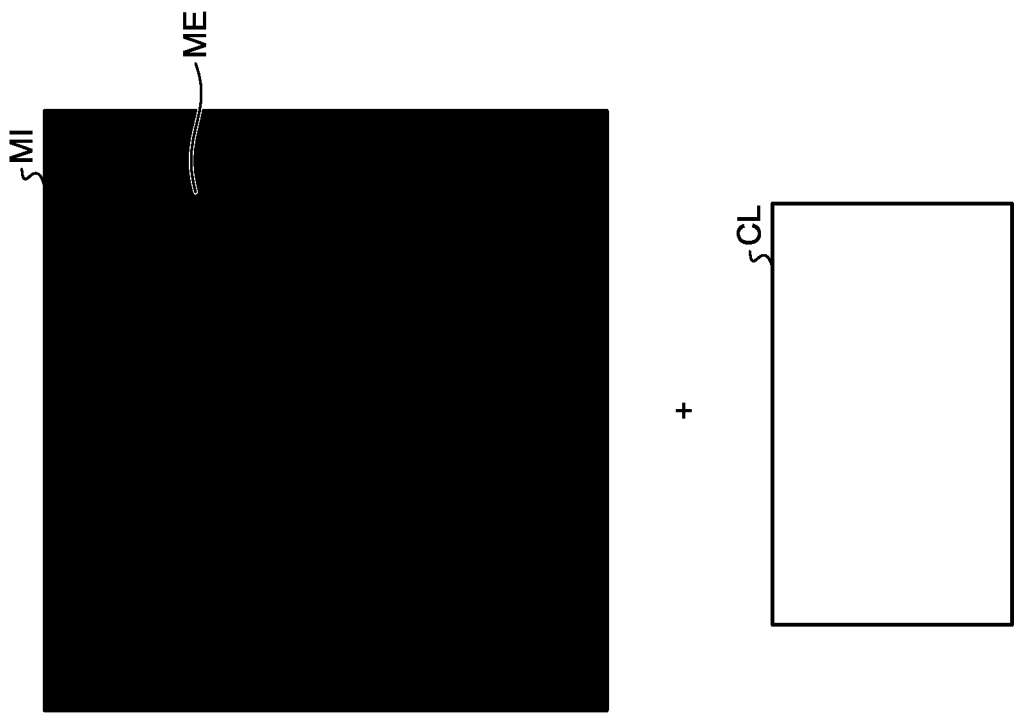
FIG. 9 is an explanatory diagram illustrating an example of a mask process according to the third modification.
Figure 9:
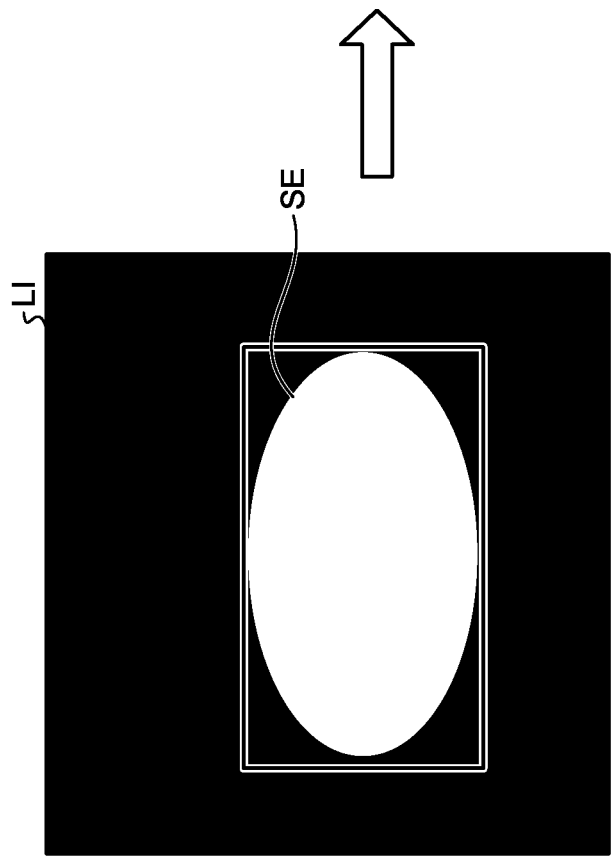

FIG. 9 is a diagram illustrating an example of the mask process. First, the mask function 246 crops a selection area SE selected by the selection function 241 from slice image data LI. As a result, the slice image data LI is segmented into out-of-target site image data MI, which is image data representing an area other than the selection area SE, and cropped image data CL. The mask function 246 sets the entire out-of-target site image data MI as a mask area ME.

The mask function 246 detects an air area from the cropped image data CL. When there is no air area in the cropped image data CL in FIG. 9, but there is an air area, the mask function 246 masks the air area and sets a mask area.

Figure 10:
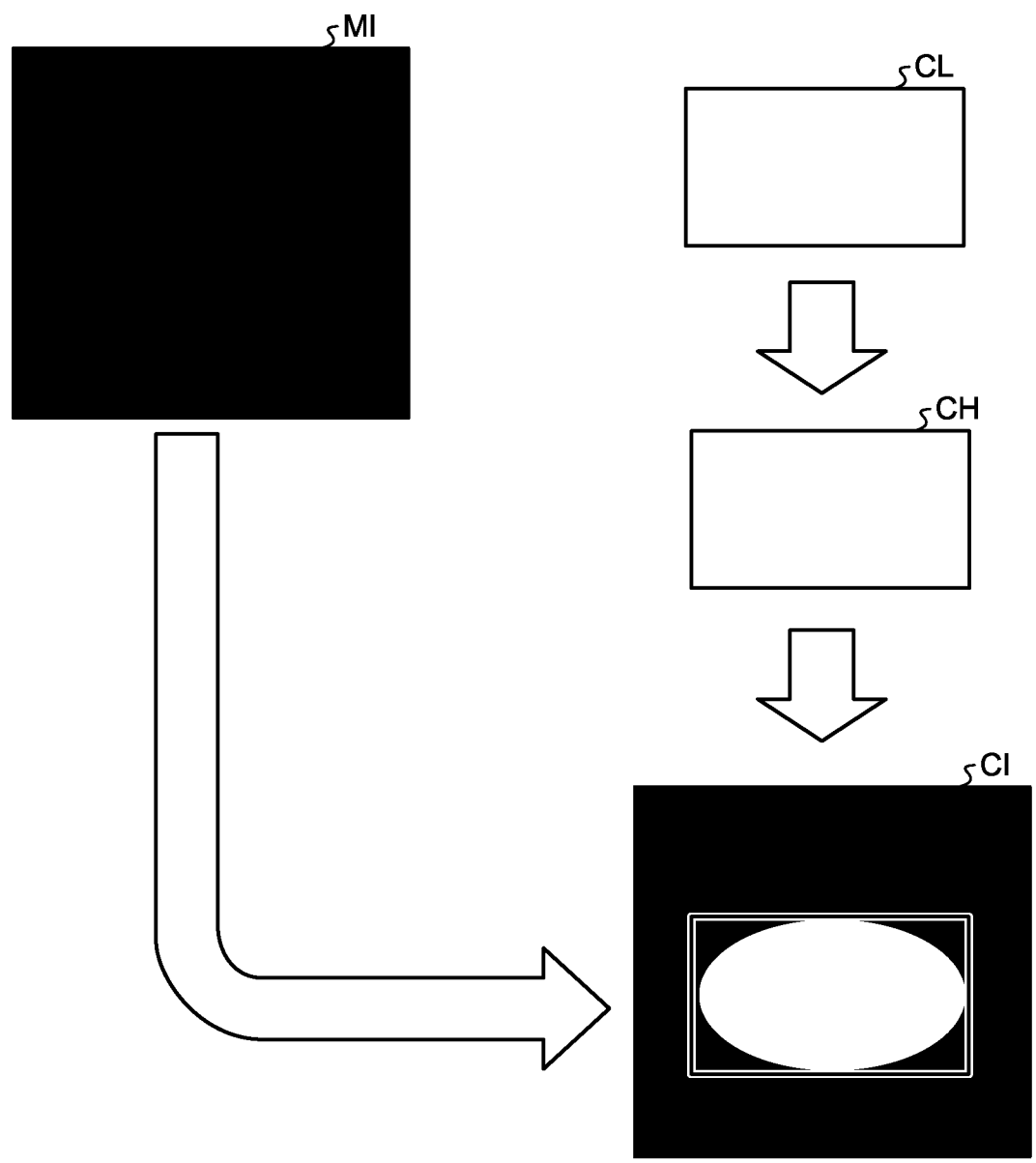
FIG. 10 is an explanatory diagram illustrating an example of an outline of a process of a medical image processing apparatus according to the third modification.

Next, a super-resolution process in the present modification is described with reference to FIG. 10. FIG. 10 is a diagram illustrating an example of an outline of the super-resolution process according to the third modification. First, the specifying function 244 specifies a target area for the cropped image data CL. The super-resolution processing function 245 crops an area specified as the target area and inputs the cropped area to the super-resolution model 211.

The super-resolution processing function 245 produces super-resolution cropped image data CH by merging super-resolution image data output from the super-resolution model 211 with image data representing an area excluding the area specified as the target area. The super-resolution processing function 245 produces super-resolution slice image data CI by merging the out-of-target site image data MI, on which the mask area ME is set, with the super-resolution cropped image data CH.

When the mask area ME is set on the cropped image data CL, the super-resolution processing function 245 excludes the mask area ME from the cropped image data CL, inputs the cropped image data CL with no mask area ME to the super-resolution model 211, and performs the super-resolution process. In this case, the super-resolution processing function 245 produces the super-resolution slice image data CI by merging image data representing the mask area ME of the cropped image data CL with the out-of-target site image data MI and the super-resolution cropped image data CH with no mask area ME.

In this example, a segmentation process of segmenting the slice image data into sub-slice image data is not performed, but the above-described mask process may be performed together with the segmentation process. In this case, after the slice image data is segmented into the sub-slice image data, the mask function 246 crops an area including the target area selected by the selection function 241 from the sub-slice image data and sets a mask area in the sub-slice image data.

The mask function 246 detects the air area for the area including the cropped target area and sets the mask area. Then, the specifying function 244 and the super-resolution processing function 245 perform a specifying process and a super-resolution processing on the target area for each piece of the sub-slice image data.

Figure 11:
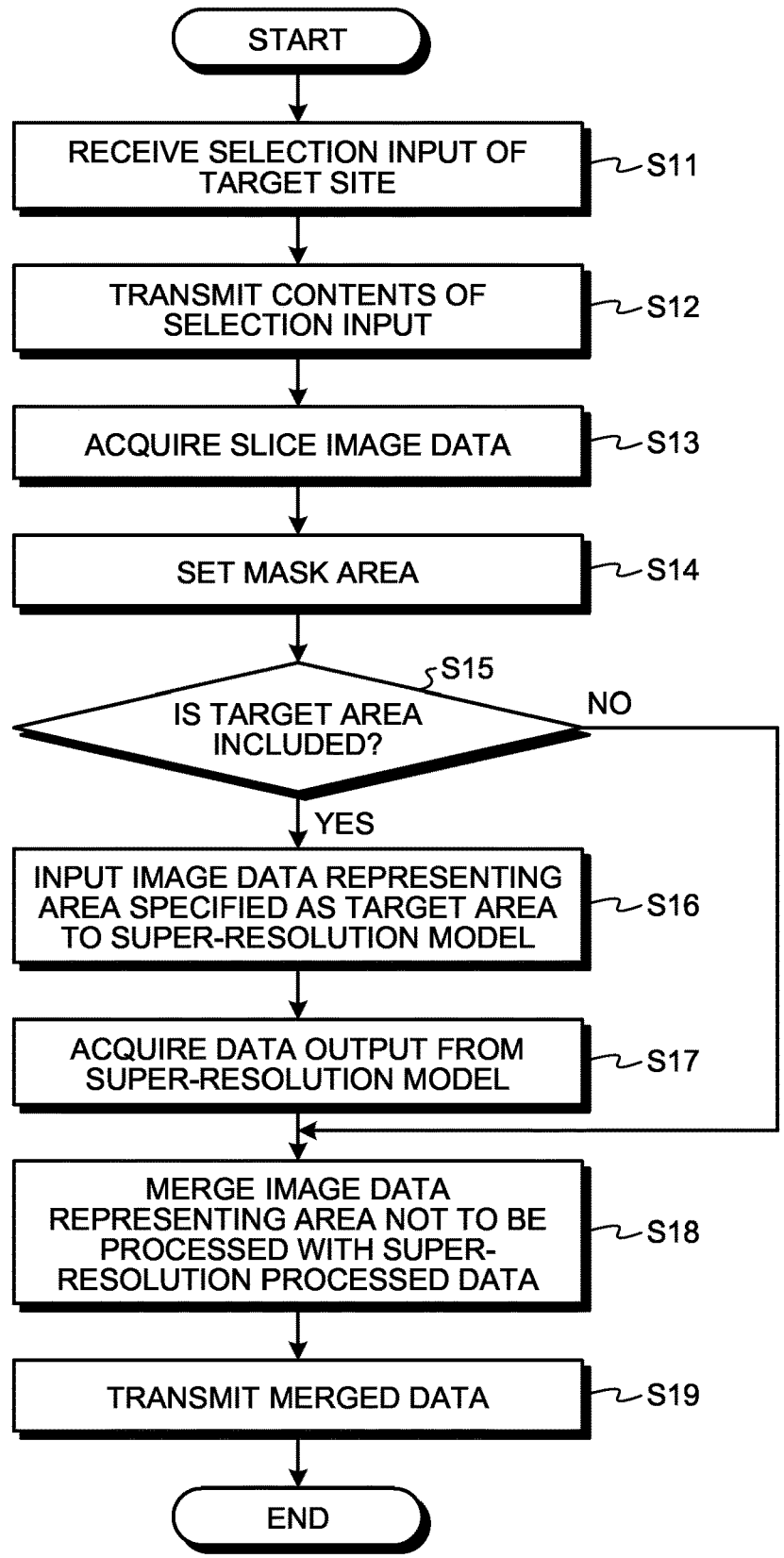
FIG. 11 is a flowchart illustrating an example of a process performed by a medical image processing apparatus according to the third modification.

Next, a process performed by the medical image processing apparatus 2 according to the present modification is described. FIG. 11 is a flowchart illustrating an example of the process performed by the medical image processing apparatus 2 according to the third modification. Since steps S11 to S13 are the same as steps S1 to S3 in FIG. 7, description thereof is omitted.

After the slice image data is acquired, the mask function 246 sets a mask area for the slice image data (step S14). Specifically, the mask function 246 crops the target site selected by the selection function 241 and sets an area other than the cropped area as the mask area. The mask function 246 detects an air area from the slice image data on the basis of the CT value of each pixel constituting the slice image data, and sets the air area as the mask area.

Subsequently, the specifying function 244 specifies a target area and an out-of-target area for areas other than the mask area in the slice image data. Specifically, the specifying function 244 specifies the target area and the out-of-target area for the areas other than the mask area in the slice image data on the basis of the target site selected by the selection function 241 and a reference edge amount set in advance for each site of the human body.

Subsequently, the specifying function 244 determines whether the areas other than the mask area in the slice image data include an area specified as the target area (step S15). When it is determined that the areas other than the mask area in the slice image data do not include the area specified as the target area (No at step S15), the procedure proceeds to the process of step S18.

On the other hand, when it is determined by the specifying function 244 that the areas other than the mask area in the slice image data include the area specified as the target area (Yes at step S15), the super-resolution processing function 245 crops the area specified as the target area from the areas other than the mask area in the slice image data and inputs the cropped image data to the super-resolution model 211 (step S16).

Subsequently, the super-resolution processing function 245 acquires super-resolution cropped image data output from the super-resolution model 211 (step S17). Subsequently, the super-resolution processing function 245 merges image data representing the mask area with the super-resolution cropped image data to produce super-resolution slice image data in which the target area is increased in resolution (step S18). Subsequently, the super-resolution processing function 245 transmits the super-resolution slice image data to the X-ray CT apparatus 1 (step S19) and terminates this process.

In accordance with the medical image processing apparatus 2 according to the present modification, an area excluding a mask area is cropped from slice image data, so that the specifying process can be performed at high speed. That is, the efficiency of the super-resolution process on a medical image can be improved.

Fourth Modification

In the above-described embodiment, a mode in which the super-resolution process is performed using one super-resolution model 211 has been described. However, the super-resolution process may be performed using different super-resolution models for each site to be subjected to the super-resolution process. In this case, the super-resolution processing function 245 performs the super-resolution process by using a super-resolution model corresponding to a target site, such as using a super-resolution model for the lung when the target site is the lung and using a super-resolution model for the heart when the target site is the heart.

For example, the super-resolution model for the lung is a learned model produced by machine learning in which "low-quality slice image data obtained by imaging the lung" is used as input-side teacher data and "high-quality slice image data obtained by imaging the lung" is used as output-side teacher data. Since the super-resolution model for the lung is machine-learned using only the slice image data obtained by imaging the lung, a super-resolution model suitable for improving the image quality of the slice image data obtained by imaging the lung is produced.

In the present modification, for example, the specifying function 244 specifies sites (lung, heart, liver, and the like) existing in the slice image data, on the basis of an edge amount. Then, the super-resolution processing function 245 performs a super-resolution process by using a super-resolution model corresponding to the specified site.

In accordance with the medical image processing apparatus 2 according to the present modification, the super-resolution process can be performed using an optimal super-resolution model for each slice image data. When a plurality of sites exist in one piece of slice image data, the super-resolution process can be performed on each site by using an optimal super-resolution model.

Fifth Modification

In the above-described embodiment, a mode in which a target area and an out-of-target area are specified has been described. However, for example, a plurality of areas may be specified, such as a first processing target area to be subjected to a first process, a second processing target area to be subjected to a second process, and the out-of-target area, and a process corresponding to each area may be performed. It is assumed that the second process is a process that imposes a smaller burden on the processing circuitry 24 than the first process does.

In the present modification, for example, the specifying function 244 specifies the first processing target area, the second processing target area, and the out-of-target area on the basis of the target site selected by the selection function 241 and the edge amount calculated from the slice image data. Specifically, a first threshold value and a second threshold value (it is assumed that the first threshold value<the second threshold value) are set in advance for a difference value between a reference edge amount representing the target site and an edge amount calculated from the slice image data.

Then, the specifying function 244 specifies an area where the difference value<the first threshold value as the first processing target area, an area where the first threshold value≤the difference value≤the second threshold value as the second processing target area, and specifies an area where the difference value>the second threshold value as the out-of-target area. Subsequently, the super-resolution processing function 245 performs the first process on the first processing target area and performs the second process on the second processing target area. The super-resolution processing function 245 does not perform any process on the out-of-scope area.

In this example, the specifying function 244 specifies the first processing target area, the second processing target area, and the out-of-target area, but may specify four or more areas. For example, the specifying function 244 may specify the first processing target area, the second processing target area, a third processing target area to be subjected to a third process, and the out-of-target area. It is assumed that the third process is a process that imposes a smaller burden on the processing circuitry 24 than the second process does.

In accordance with the medical image processing apparatus 2 according to the present modification, heavy processing can be performed on an area that requires heavy processing burden and light processing can be performed on an area that does not require such heavy processing burden, thereby improving processing speed. When specifying two areas, that is, an area to be subjected to a super-resolution process and an area not to be subjected to the super-resolution process, and performing the super-resolution process, a user may feel uncomfortable in an area near the boundary between the two areas, for example. However, by specifying an area to be subjected to the light processing as in the present modification, the effect of reducing the above discomfort can be expected.

According to at least the embodiment and modifications described above, the efficiency of the super-resolution process on a medical image can be improved.

The term "processor" used in the above description, for example, means a circuit such as a central processing unit (CPU), a graphics processing unit (GPU), an application specific integrated circuit (ASIC), or a programmable logic device (for example, a simple programmable logic device (SPLD), a complex programmable logic device (CPLD), and a field programmable gate array (FPGA)).

The processor implements functions by reading the computer programs stored in the memory 41 and executing the read computer programs. Instead of storing the computer programs in the memory 41, the computer programs may be directly incorporated in the circuit of the processor. In this case, the processor implements the functions by reading and executing the computer programs incorporated in the circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
processing circuitry configured to:
  acquire medical image data to be processed,
  specify a target area to be subjected to a super-resolution process and an out-of-target area not to be subjected to the super-resolution process from the medical image data based on of the medical image data, the super-resolution process being for improving image quality,
  output information representing the specified target area and information representing the specified out-of-target area,
  perform the super-resolution process on cropped image data resulting from cropping the specified target area from the medical image data. based on the information representing the specified target area,
  generate merged image data by merging super-resolution image data with out-of-target-area image data representing the specified out-of-target area of the medical image data, the super-resolution image data being the cropped image data subjected to the super-resolution process; and
  display the generated merged image data.

2. The medical image processing apparatus according to claim 1, wherein
  the processing circuitry is further configured to select a target site of a subject to be subjected to the super-resolution process from the medical image data, and
  the processing circuitry is further configured to specify the target area from the medical image data based on whether the target site is included.

3. The medical image processing apparatus according to claim 2, wherein the processing circuitry is further configured to select, as the target site, a site of the subject designated by a user.

4. The medical image processing apparatus according to claim 2, wherein the processing circuitry is further configured to select the target site based on an imaging site of the subject.

5. The medical image processing apparatus according to claim 2, wherein the processing circuitry is further configured to select the target site based on a medical history of the subject.

6. The medical image processing apparatus according to claim 2, wherein the processing circuitry is further configured to specify the target area based on a predetermined reference value of data values representing the target site and a distribution of data values included in the medical image data.

7. The medical image processing apparatus according to claim 6, wherein the processing circuitry is further configured to specify the target area based on a the reference value of the data values including at least one of a pixel value or an edge amount and the distribution of the data values included in the medical image data.

8. The medical image processing apparatus according to claim 1, wherein the processing circuitry is further configured to segment the medical image data into a plurality of pieces of sub-data and specify the target area based on of the pieces of sub-data.

9. The medical image processing apparatus according to claim 8, wherein the processing circuitry is further configured to specify the target area based on a distribution of data values included in the pieces of sub-data.

10. A medical image processing method, comprising:
  acquiring medical image data to be processed;
  specifying a target area to be subjected to a super-resolution process and an out-of-target area not to be subjected to the super-resolution process from the medical image data based on the medical image data, the super-resolution process being for improving image quality;
  outputting information representing the specified target area and information representing the specified out-of-target area;
  performing the super-resolution process on cropped image data resulting from cropping the specified target area from the medical image data. based on the information representing the specified target area;
  generating merged image data by merging super-resolution image data with out-of-target-area image data representing the specified out-of-target area of the medical image data, the super-resolution image data being the cropped image data subjected to the super-resolution process; and displaying the generated merged image data.

11. A non-transitory computer-readable storage medium storing a program that causes a computer to execute a program configured to:

acquire medical image data to be processed;

specify a target area to be subjected to a super-resolution process and an out-of-target area not to be subjected to the super-resolution process from the medical image data based on the medical image data, the super-resolution process being for improving image quality;

output information representing the specified target area and information representing the specified out-of-target area;

perform the super-resolution process on cropped image data resulting from cropping the specified target area from the medical image data. based on the information representing the specified target area;

generate merged image data by merging super-resolution image data with out-of-target-area image data representing the specified out-of-target area of the medical image data, the super-resolution image data being the cropped image data subjected to the super-resolution process; and display the generated merged image data.

* * * * *